United States Patent
Guendert et al.

(10) Patent No.: US 12,189,984 B2
(45) Date of Patent: Jan. 7, 2025

(54) EXECUTING A HOST INITIATED LINK RESET IN A STORAGE AREA NETWORK

(71) Applicant: International Business Machines Corporation, Armonk, NY (US)

(72) Inventors: Stephen Robert Guendert, Poughkeepsie, NY (US); Michael James Becht, Poughkeepsie, NY (US); Pasquale A. Catalano, Wallkill, NY (US); Christopher J Colonna, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 478 days.

(21) Appl. No.: 17/476,594

(22) Filed: Sep. 16, 2021

(65) Prior Publication Data
US 2023/0078787 A1 Mar. 16, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0632* (2013.01); *G06F 3/0659* (2013.01); *G06F 3/067* (2013.01)

(58) Field of Classification Search
CPC .... G06F 3/0656; G06F 3/0604; G06F 3/0632; G06F 3/0659; G06F 3/067;
(Continued)

(56) References Cited

U.S. PATENT DOCUMENTS 6,044,406 A 3/2000 Barkey et al.
6,823,453 B1 * 11/2004 Hagerman .......... H04L 63/1466
713/168
(Continued)

FOREIGN PATENT DOCUMENTS

CN 101175077 A 5/2008
CN 103051482 A 4/2013
(Continued)

OTHER PUBLICATIONS

Guendert, Steve Ph.D. "Understanding the Fibre Channel/FICON Buffer to Buffer Credit Recovery Mechanism", Proceedings of the 2010 Computer Measurement Group Conference, Paper No. 5017; dated dated 2010, 45 pgs.
(Continued)

*Primary Examiner* — Ayaz R Sheikh
*Assistant Examiner* — Tarell A Hampton
(74) *Attorney, Agent, or Firm* — CANTOR COLBURN LLP; Edward Wixted

(57) ABSTRACT

Embodiments include performing a host-initiated link reset in a storage area network (SAN). Aspects include identifying, by a host in communication with the SAN, each link in the SAN, wherein each link is defined by a pair of ports. Aspects also include obtaining, by the host, a buffer credit balance for each port in the SAN and obtaining, by the host, a buffer credit for each port in the SAN and causing a reset of a link associated with the port by transmitting a link reset record from the host to a control device of the link based on a determination that the buffer credit of a port in the SAN is below a threshold value.

14 Claims, 5 Drawing Sheets

(58) Field of Classification Search
CPC ............... H04L 41/0661; H04L 43/067; H04L 43/0817; H04L 43/0882; H04L 47/215; H04L 43/16; H04L 67/1097
See application file for complete search history.

(56) References Cited

U.S. PATENT DOCUMENTS

| | | | |
|---|---|---|---|
| 7,352,701 | B1 | 4/2008 | Kunz |
| 7,787,375 | B2 | 8/2010 | Dickens et al. |
| 8,072,988 | B2 | 12/2011 | Dropps et al. |
| 9,036,479 | B2 | 5/2015 | Chan |
| 9,385,967 | B1 | 7/2016 | Hathorn et al. |
| 10,496,333 | B2 | 12/2019 | Yang et al. |
| 10,992,580 | B2 * | 4/2021 | Mazurek ................. H04L 49/30 |
| 11,297,006 | B1 * | 4/2022 | Bharadwaj .............. H04L 49/70 |
| 2003/0126223 | A1 | 7/2003 | Jenne et al. |
| 2004/0030766 | A1 | 2/2004 | Witkowski |
| 2004/0057389 | A1 * | 3/2004 | Klotz ...................... H04L 41/20 370/252 |
| 2005/0076113 | A1 | 4/2005 | Klotz et al. |
| 2005/0216783 | A1 | 9/2005 | Sundaram et al. |
| 2014/0254371 | A1 * | 9/2014 | Chan ...................... H04L 47/30 370/235 |
| 2016/0057038 | A1 * | 2/2016 | Watanabe ........... H04L 43/0847 370/244 |
| 2018/0167454 | A1 | 6/2018 | Ambach et al. |
| 2019/0089649 | A1 | 3/2019 | Hathorn et al. |
| 2019/0342217 | A1 * | 11/2019 | Mazurek ............. H04L 67/1097 |
| 2019/0394138 | A1 | 12/2019 | Raisch et al. |
| 2021/0021526 | A1 | 1/2021 | Bharadwaj |

FOREIGN PATENT DOCUMENTS

| | | |
|---|---|---|
| CN | 109725829 A | 5/2019 |
| CN | 111884866 A | 11/2020 |
| WO | 2021218484 A1 | 11/2021 |

OTHER PUBLICATIONS

International Search Report; U.S. Appl. No. 16/860,306; International Filing Date: Mar. 19, 2021 ; Date of mailing: Jun. 18, 2021; 11 pages.

List of IBM Patents or Patent Applications Treated as Related; Date Filed: Sep. 16, 2021, 2 pages.

Stephen Robert Guendert et al., "Host Initiated Link Reset in a Storage Area Network", U.S. Appl. No. 16/860,306, filed Apr. 28, 2020.

Zhang, Yu et al. "Implementation of FC-1 and FC-2 Layer for Multi-Gigabit Fibre Channel Transport", retrieved at: https://ieeexplore.ieee.org/document/4426120; published Dec. 8, 2007; 5 pgs.

International Search Report; International Application No. PCT-EP2022-074351; International Filing Date: Sep. 1, 2022; Date of mailing: Dec. 6, 2022; 13 pages.

International Search Report; U.S. Appl. No. 16/162,264; International Filing Date: Apr. 28, 2020 ; Date of mailing: Mar. 11, 2023 ; 3 pages.

Chinese Office Action; Application No. 111126413; Filed Jul. 14, 2011; Mailed: Jan. 30, 2023; 7 pages.

Chinese Office Action; Application No. 202180031517; Filed Mar. 19, 2021; Mailed: Aug. 31, 2023; 9 pages.

German Office Action; Application No. 112021002577.5 ; Filed Oct. 24, 2022; Mailed: May 22, 2023; 4 pages.

Japanese Office Action; Application No. 2022559988 ; Filed Mar. 19, 2021; Mailed: Jul. 19, 2024; 7 pages.

* cited by examiner

500

| Code | Command | Description | TKI | Identify | Accepted with HCP | Count |
|---|---|---|---|---|---|---|
| XXX | Link Reset | Transfers a link reset record from the host to a control device to initiate a link reset and restore BB credits to initial configured value | No | Yes | Yes | 256 |

| Word | Byte 0 | | | Byte 1 | Byte 2 | Byte 3 |
|---|---|---|---|---|---|---|
| 0 | Director Type | C | R | Source Port Address Identifier 608 | | |
| 1 | Director Domain ID 612 | | | Destination Port Address Identifier 610 | | |
| 2 | | | | Transmit Frame Pacing Time 614 | | |
| 3 | | | | Receive Frame Pacing Time 616 | | |
| 4 / 5 | | | | Host Identifier 618 | | |
| 6 / 7 | | | | Threshold value 620 | | |
| 8 / 9 / 10 / 15 | | | | Reserved | | |

FIG. 6

EXECUTING A HOST INITIATED LINK RESET IN A STORAGE AREA NETWORK

BACKGROUND

The present invention generally relates to storage area networks (SANs), and more specifically, to a executing a host initiated link reset in a SAN.

During normal operation of a SAN, the fibre channel frames, including acknowledgments may become corrupted in transport. Such corruption can be caused by optics failing, bad cables, loose connections, optical budgets not within tolerances, intermittent hardware malfunctions, etc.

When a receiving side of a fibre channel connection cannot recognize a start of frame (SOF) in the header of the incoming frame, the receiver does not respond with the appropriate acknowledgment. In one example, a sender decrements an available buffer credit by one upon sending the frame but does not receive the corresponding acknowledgment. As a result, the synchronization between the sender and receiver in terms of buffer credits becomes skewed. When this condition occurs, it will continue and cause the number of buffer credits perceived to be available to gradually decrease to the point where it impacts performance, or even lead to link transmission stopping altogether.

Currently, buffer credit recovery mechanisms provided in fibre channel standards attempt to prevent errors in the synchronization of buffer credits between a sender and receiver from occurring. The standards support two modes of buffer credit recovery: 1) a link reset and 2) a calculation that simply results in replenishing the credits. However, both of the modes of buffer credit recovery are performed exclusively by network devices, such as a switch, and only for the switch ports.

SUMMARY

Embodiments of the present invention are directed to a computer-implemented method for performing a host-initiated link reset in a storage area network (SAN). A non-limiting example of the computer-implemented method includes identifying, by a host in communication with the SAN, each link in the SAN, wherein each link is defined by a pair of ports. The method also includes obtaining, by the host, a buffer credit for each port in the SAN and causing a reset of a link associated with the port by transmitting a link reset record from the host to a control device of the link based on a determination that the buffer credit of a port in the SAN is below a threshold value.

Embodiments of the present invention are directed to a storage area network (SAN). A non-limiting example of the SAN includes one or more network devices and a plurality of end devices each coupled to at least one of the one or more network devices. One of the plurality of end devices is a host device that is configured to identify each link in the SAN, wherein each link is defined by a pair of ports. The host device is also configured to obtain a buffer credit for each port in the SAN and cause a reset of a link associated with the port by transmitting a link reset record from the host to a control device of the link based on a determination that the buffer credit of a port in the SAN is below a threshold value.

Embodiments of the invention are directed to a computer program product for performing a host-initiated link reset in a storage area network (SAN), the computer program product comprising a computer-readable storage medium having program instructions embodied therewith. The program instructions are executable by a processor to cause the processor to perform a method. A non-limiting example of the method includes identifying, by a host in communication with the SAN, each link in the SAN, wherein each link is defined by a pair of ports. The method also includes obtaining, by the host, a buffer credit for each port in the SAN and causing a reset of a link associated with the port by transmitting a link reset record from the host to a control device of the link based on a determination that the buffer credit of a port in the SAN is below a threshold value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a block diagram of a link reset command in accordance with another embodiment of the invention is shown; and FIG. 6 depicts a block diagram of a link reset record in accordance with another embodiment of the invention is shown.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Exemplary embodiments include methods, systems and computer program product for performing a host-initiated link reset in a storage area network (SAN). In exemplary embodiments, a host device that is connected to the SAN is configured to monitor the buffer credits reported as available on all ports in the SAN, including channel ports and switch ports. The host device is further configured to cause a link reset in the SAN upon determining that a buffer credit of a port associated with a link is below a threshold value. The link reset forces the buffer credit counters for both ports of the link to return to their full default value.

Figure 1:
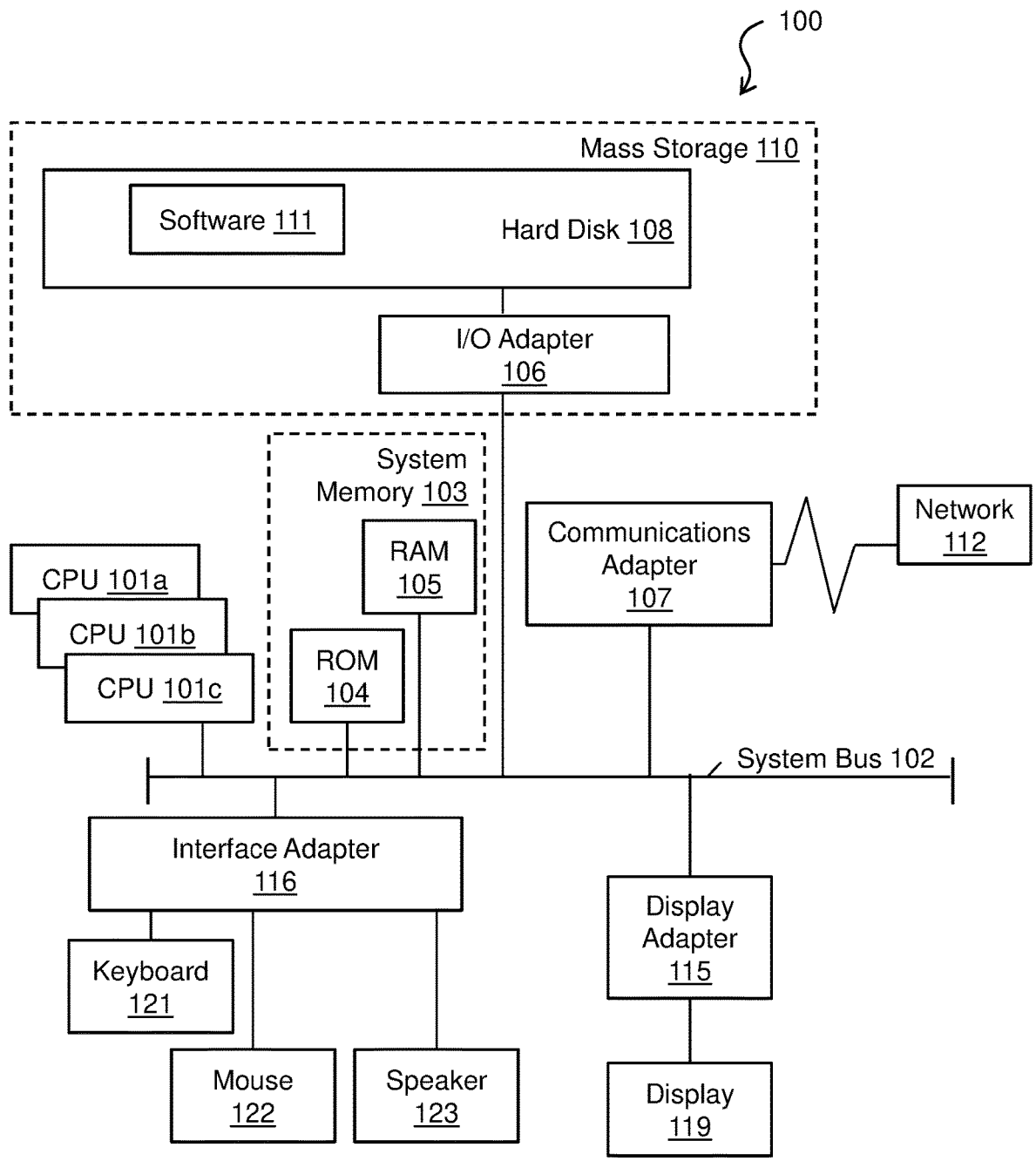
FIG. 1 is a schematic diagram of a computer system, in accordance with an embodiment of the invention.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
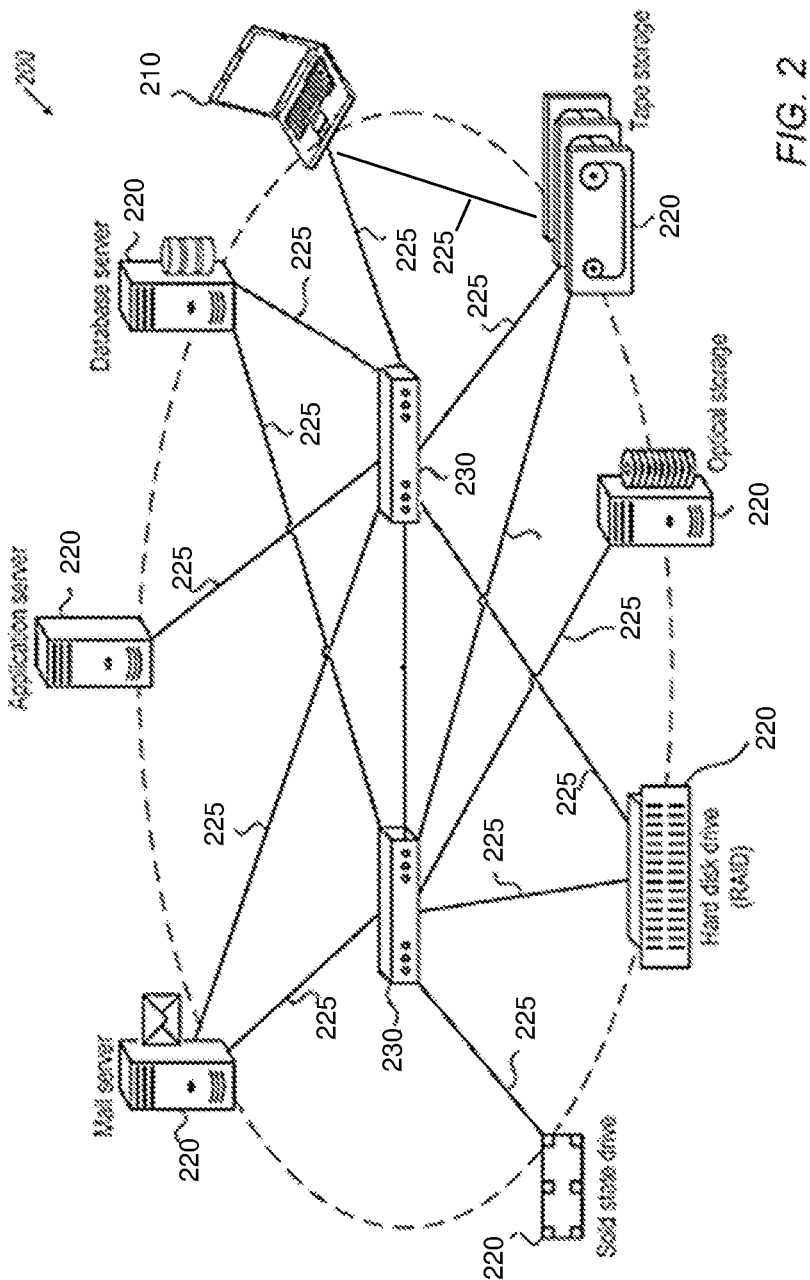
FIG. 2 is a schematic diagram of a storage area network, in accordance with an embodiment of the invention.

FIG. 2 is a diagram of a storage area network (SAN) 200, in accordance with an embodiment. SAN 200 includes a plurality of end devices 210, 220 that are each connected to one or more network devices 230, such as switches. Network devices 230 include memory circuitry and processing circuitry (e.g. including monitoring circuitry and limiting circuitry). The network topology of SAN 200 may be a switched fabric, where network devices 230 are switches. In some embodiments, a particular switch 230 may be set to switch mode or N-port ID virtualization (NPIV) mode. In exemplary embodiments, at least one of the end devices 210, 220 in the SAN device 210 is configured as a host device 210. In one embodiment, the host device 210 is embodied in a computer system, such as the one shown in FIG. 1.

In exemplary embodiments, each of the network devices 230 includes a plurality of ports that connect the network devices 230 to various end devices 210, 220 via links 225.

In addition, each end device 210, 220 includes one or more ports that connect the end devices to one or more network devices 230 or to other end devices 220. In exemplary embodiments, each link 225 is defined by the two ports that are connected to the link 255. The ports of end devices 220, 210 are referred to as channel ports while the ports of the network devices 230 are referred to as switch ports.

In exemplary embodiments, the network devices 230 support the Fibre Channel (FC) and/or Fibre channel over Ethernet (FCoE) Protocols. For example, a particular fixed port network device may support the FC protocol and/or the FCoE protocol. As another example, if a particular network device includes a plurality of line cards, at least some of which may support the FC protocol and/or at least some of which may support the FCoE protocol. It is noted that a particular port on a particular network device 230 may support the FC protocol or the FCoE protocol by default or as configured (e.g. if the particular port is a universal port). Optionally, network devices 230 support one or more other protocols such as simple network management protocol (SNMP) for collecting information, e.g. for output on management device 210.

Figure 3:
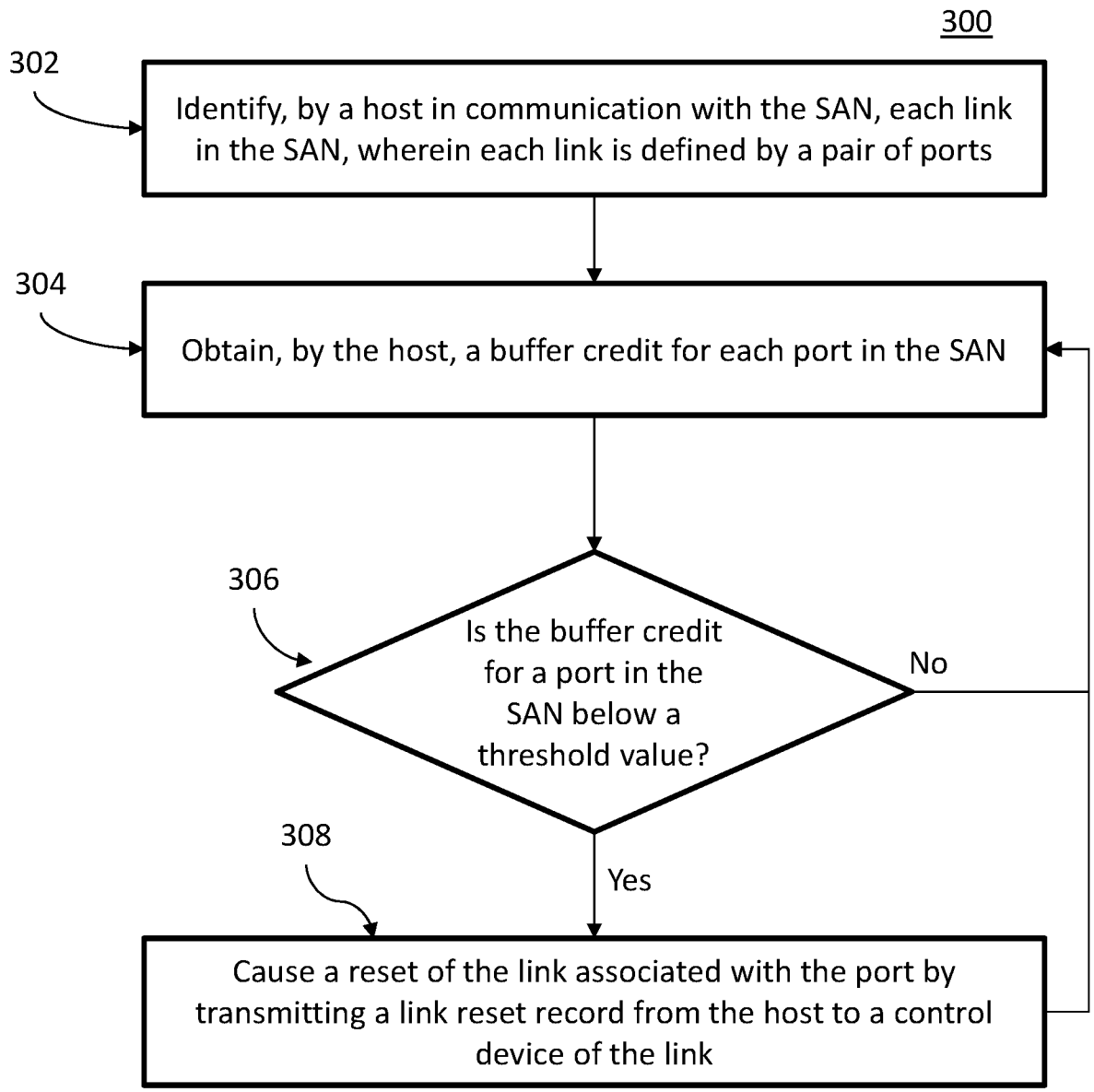
FIG. 3 depicts a flow diagram of a method for performing a host-initiated link reset in a storage area network, in accordance with an embodiment of the invention.

Referring now to FIG. 3, a flow diagram of a method 300 for performing a host-initiated link reset in a storage area network, in accordance with an embodiment of the invention is shown. As shown at block 302, the method 300 includes identifying, by a host in communication with the SAN, each link in the SAN. In exemplary embodiments, each link in the SAN is defined by a pair of ports, which are one of a channel port and a switch port or in the case of inter-switch links it can be two switch ports. The method 300 also includes obtaining, by the host, a buffer credit for each port in the SAN, as shown at block 304. Next, as shown at block 306, the method 300 includes determining if the buffer credit for a port in the SAN has fallen below a threshold value. If the buffer credit for a link port in the SAN has fallen below the threshold value, the method 300 proceeds to block 308 and causes a reset of the link by transmitting a link reset record from the host to a control device of the port. Otherwise, the method 300 returns to block 304.

In exemplary embodiments, the threshold value has a default value of one and can be set to any other positive integer value by a user of the host device. In another embodiment, the threshold may be set based on the link characteristics, such as the bit rate of the link, and/or the distance of the link. In exemplary embodiments, obtaining the buffer credit for each port in the SAN is performed on a periodic basis. For example, in one embodiment, the host device is configured to obtain the buffer credit for each port in the SAN every fifteen minutes, or at another predetermined interval that is set by a user of the host device.

In exemplary embodiments, once it is determined that a link needs to be reset the action that is taken to reset the link depends upon a type of the ports that define the link. In one embodiment, based on the determination that at least one of the pair of ports for the link is a channel port, the host device causes the link to be reset by issuing a command to the channel port to reset the link. In another embodiment, based on the determination that neither of the pair of ports is a channel port, the host device causes the link to be reset by instructing a network device in the SAN associated with the link to perform a reset of the link. In one embodiment, the instruction is sent to the network device using the Control Unit Port (CUP).

In exemplary embodiments, the SAN utilizes fibre channels for communication among the nodes. Fibre channels are configured to send packets of data referred to as frames, which include frame delimiters that demarcate the start of frame (SOF) or the end of frame (EOF). Primitive signals represent events on the sending port include an acknowledgment signal (R_RDY) and buffer-to-buffer state change (BB_SC) signals. A BB_RDY_N variable is commonly used to maintain a count of R_RDY primitives received and BB_FRM_N maintains a count of frames received. The Buffer to Buffer State Change Number (BB_SC_N) reflects the value specifying the number of frames between BB_SCs primitive signals and the number of R_RDYs between BB_SCr primitive signals. The Buffer to Buffer State Change-R_RDY (BB_SCr) signal is transmitted periodically to enable the attached port to determine if any R_RDYs have been lost. A Buffer to Buffer State Change-SOF (BB_SCs) signal is transmitted to enable an attached port to determine if any frames have been lost.

In exemplary embodiments, the BB_SC_N (Buffer to Buffer state change number) is used to track an agreed-upon buffer credit maximum for a link between two ports. For example, when two ports are connected, during login (FLOGI or PLOGI) the ports perform an exchange link parameters (ELP) and send each other an internal link services (ILS) frame carrying their value. If the two ports have different values, then the larger of the two values is used by both ports. Typically, BB_SC_N ranges from 1 to 15. In exemplary embodiments, a variable F is used to specify a number of frames to be sent between BB_SCs and the number of R_RDYs sent between BB_SCr primitive signals. In one embodiment F is defined as $2^{BB\_SC\_N}$. In other words, to establish checkpoints a BB_SCs signal is sent after every F frames and a BB_SCr is sent after every F R_RDYs. In one example, BB_SC_N=3, →F=8. In this example, each port will send BB_SCs after every 8 frames that are subject to buffer to buffer flow control and each port will send BB_SCr after every 8 R_RDYs.

In exemplary embodiments, each port maintains a count of the number of frames, for example BB_FRM_N, received between the completion of login and receipt of the first BB_SCs. In addition, each port also maintains a count between successive occurrences of BB_SCs. When the count of the number of frames reaches F, it wraps back to zero and starts over. However, if the counter is not at zero when the BB_SCs arrives, it means that one or more of the frames were lost.

In exemplary embodiments, each port maintains a count of the number of R_RDYs, for example BB_RDY_N, received between completion of login and receipt of the first BB_SCr. Each port also maintains a count between successive occurrences of BB_SCr. When the count of the number of R_RDYs reaches the computed value F, it wraps back to zero and starts over. However, if the count of the number of R_RDYs received is not zero when BB_SCr is received, one or more R_RDYs has been lost.

Figure 4:
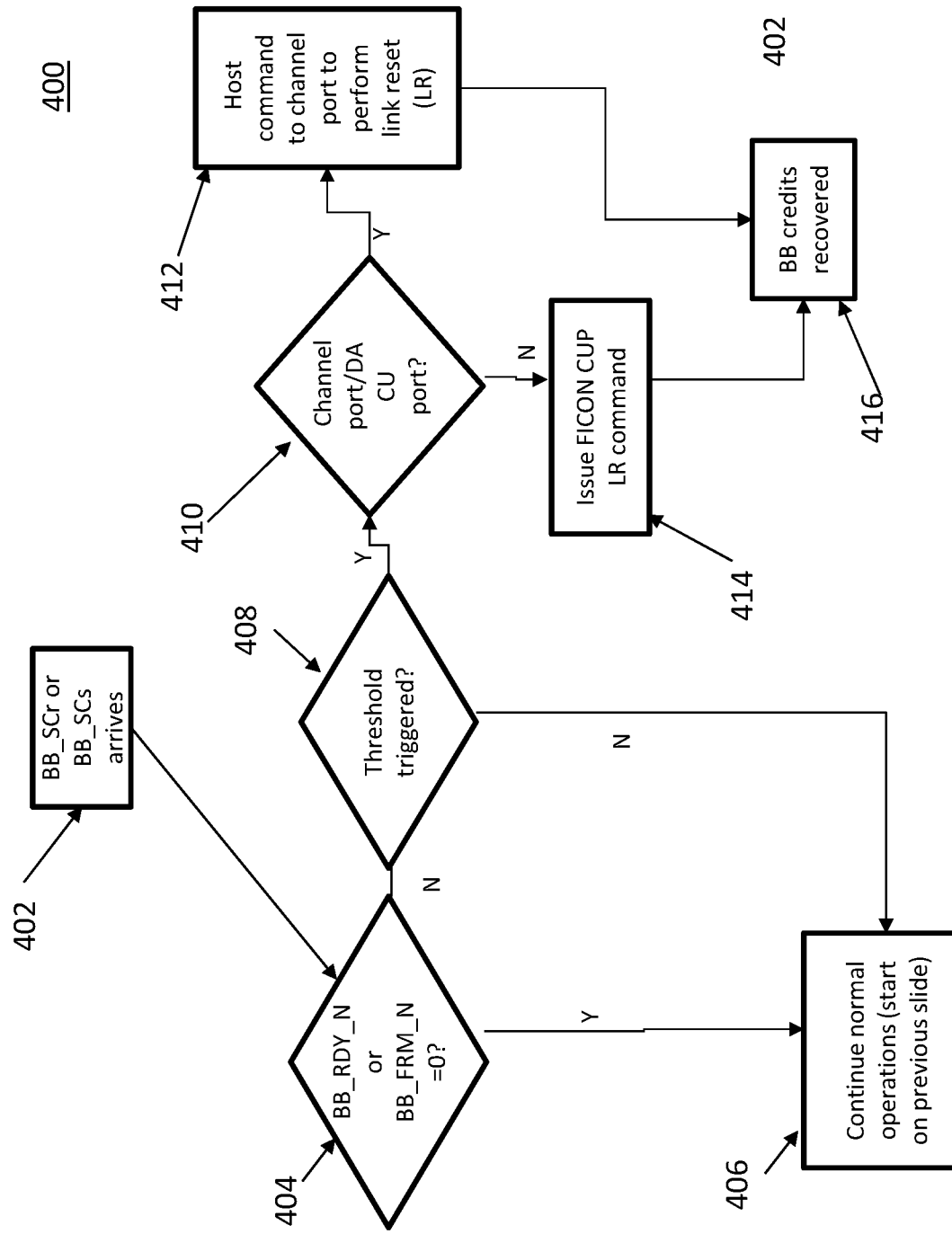
FIG. 4 depicts a flow diagram of a method for performing a host-initiated link reset in a storage area network, in accordance with another embodiment of the invention.

Referring now to FIG. 4 depicts a flow diagram of a method 400 for performing a host-initiated link reset in a storage area network in accordance with another embodiment of the invention. As shown at block 402, a BB_SCr or BB_SCs arrives at port. Next, as shown at decision block 404, it is determined if BB_RDY_N or BB_FRM_N are equal to zero. If BB_RDY_N or BB_FRM_N are equal to zero, the method 400 proceeds to block 406 and continues normal operations of the SAN. However, if one of BB_RDY_N and BB_FRM_N are not equal to zero, it is determined that one or more frames or R_RDYs were lost and the method 400 proceed to decision block 408.

As will be understood by those of ordinary skill in the art, BB_RDY_N and BB_FRM_N are different embodiments of the counting/tracking implementation allowed in the fibre channel standards. In exemplary embodiments, it is normal for these counters to have a zero value and no action required. However, when these counters have a non-zero values, it indicates R_RDY primitives were lost/unaccounted for, and hence the number of buffer credits available on the receiving half of the link will no longer be their full/expected configured value. In exemplary embodiments, a threshold value is used to trigger to determine when to execute the buffer credit recovery. In different embodiments, the threshold trigger may be a user-configurable value based on a percentage of the port's login BB_Credit value, 0 buffer credits remaining, buffer credits below a specified value (for example, less than 5) or a number of instances of frame pacing delay being reported via the RMF (Resource Measurement Facility) 74-7 (FICON Director Activity report) during the configured RMF interval.

Continuing with reference to FIG. 4, at decision block 408 it is determined if the threshold for buffer credit loss triggered. If so, the method 400 proceeds to decision block 410. Otherwise, the method 400 proceeds to block 406 and continues normal operations of the SAN. At decision block 410, it is determined if one or more of the ports of the link are a channel port, or a directly attached control unit (CU) port. If one or more of the ports of the link are a channel port, or a directly attached CU port, the method proceeds to block 412 and the host device issues a command to channel port to perform link reset (LR). Otherwise, the method proceeds to block 414 and the host device issues a command (via FICON CUP or SMI-S) to perform a link reset. In exemplary embodiments, the host device transmits a link reset command to a control device for the identified link. The link reset command includes a link reset record that is created by the host. The link reset record includes, among other things, an identification of the source port and destination port that define the link to be reset. The method 400 concludes at block 416 when the buffer credits on the link being restored. In exemplary embodiments, during a LR, frames are not discarded, they are held in buffers until the LR concludes and the LR resets all involved counters to initial values, in effect, "replenishing" "lost" Buffer Credits.

Referring now to FIG. 5, a link reset command 500 in accordance with another embodiment of the invention is shown. In exemplary embodiments, a host device is configured to create the link reset command 500 and to transmit the link reset command 500 to a control device. In exemplary embodiments, the control device is a network device in the SAN that is associated with the link that is to be reset. The link reset command 500 is transmitted with a link reset record, which causes the control device to reset the link.

Referring now to FIG. 6, a link reset record 600 in accordance with another embodiment of the invention is shown. As illustrated, the link reset record 600 includes a director type field 602, a C field 604, a R field 606, a source port address identifier field 608, a destination port address identifier field 610, a director domain ID field 612, a transmit frame pacing time field 614, a receive frame pacing time field 616, a host identifier field 618, and a threshold value field 620. In one embodiment, the director type field 602 is a four-bit field that is used to identify a type of a director that created the link reset record 600. The director type is used to identify the type of director listed in the director ID 612 field. The director type is one of a source director, an intermediate director, and a destination director. A source director type indicates that the director ID 612 field identifies the source port address of the link to be reset. An intermediate director type indicated that the director ID 612 field identifies a director that is located between the source director and the destination director and does not contain either the source or destination port addresses. The destination director type indicated that the director ID 612 field identifies the destination port address of the link to be reset. The C field 604 is used to specify whether the link reset threshold used is the transmit frame pacing time or the receive frame pacing time. The R field 606 is a reserved field that contains all zeros by default. The source port address identifier field 608 contains the twenty-four-bit fiber channel source port address identifier of the link to be reset. The destination port address identifier field 610 contains the twenty-four-bit fiber channel destination port address identifier of the link to be reset. The transmit frame pacing time field 614 and the receive frame pacing time field 616 include a count of the number of frame transmission units that have been blocked from being transmitted or received. The host identifier field 618 contains an identification of the host that created the link reset record 600. The threshold value field 620 contains a user defined value for a threshold for frame pacing time used to generate the link reset record 600

In exemplary embodiments, upon a host detecting that a buffer credit for a link in a storage area network is below a threshold value, the host device creates a link reset record, such as the one shown in FIG. 6. Next, the host creates a link reset command, such as the one shown in FIG. 5. The link reset command, along with the link reset record, are then transmitted from the host to a control device for the identified link. The link reset command includes a link reset record that is created by the host.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing a host-initiated link reset in a storage area network (SAN), the method comprising:
   identifying, by a host in communication with the SAN, each link in the SAN, wherein each link is defined by a pair of ports;
   obtaining, by the host, a buffer credit for each port in the SAN; and
   based on a determination that the buffer credit of a port in the SAN is below a threshold value, causing a reset of a link associated with the port by transmitting a link reset record from the host to a control device of the link, wherein the link reset record includes a source port address and a destination port address that identify the link.

2. The computer-implemented method of claim 1, wherein obtaining the buffer credit for each port in the SAN is performed on a periodic basis.

3. The computer-implemented method of claim 2, wherein a frequency of the periodic basis is configurable by a user of the host.

4. The computer-implemented method of claim 1, wherein the threshold value is a predetermined number that is provided by a user.

5. The computer-implemented method of claim 1, wherein the threshold value is a predetermined number has a default value of zero.

6. A storage area network (SAN) comprising:
   one or more network devices;
   a plurality of end devices each coupled to at least one of the one or more network devices, wherein one of the plurality of end devices is a host device that is configured to:
      identify each link in the SAN, wherein each link is defined by a pair of ports;
      obtain a buffer credit balance for each port in the SAN; and
      based on a determination that the buffer credit of a port in the SAN is below a threshold value, cause a reset of a link associated with the port by transmitting a link reset record from the host to a control device of the link, wherein the link reset record includes a source port address and a destination port address that identify the link.

7. The SAN of claim 6, wherein obtaining the buffer credit for each port in the SAN is performed on a periodic basis.

8. The SAN of claim 7, wherein a frequency of the periodic basis is configurable by a user of the host.

9. The SAN of claim 6, wherein the threshold value is a predetermined number that is provided by a user.

10. The SAN of claim 6, wherein the threshold value is a predetermined number has a default value of zero.

11. A computer program product for performing a host-initiated link reset in a storage area network (SAN), the computer program product comprising:
    a non-transitory computer-readable storage medium having program instructions embodied therewith, the program instructions readable by a processor to cause the processor to:
       identify, by a host in communication with the SAN, each link in the SAN, wherein each link is defined by a pair of ports;
       obtain, by the host, a buffer credit balance for each port in the SAN;
       obtain a buffer credit balance for each port in the SAN; and
       based on a determination that the buffer credit of a port in the SAN is below a threshold value, cause a reset of a link associated with the port by transmitting a link reset record from the host to a control device of the link, wherein the link reset record includes a source port address and a destination port address that identify the link.

12. The computer program product of claim 11, wherein obtaining the buffer credit for each port in the SAN is performed on a periodic basis.

13. The computer program product of claim 11, wherein the threshold value is a predetermined number that is provided by a user.

14. The computer program product of claim 11, wherein the threshold value is a predetermined number has a default value of zero.

\* \* \* \* \*